(12) United States Patent
Flora et al.

(10) Patent No.: US 10,927,885 B1
(45) Date of Patent: Feb. 23, 2021

(54) STEERABLE AXLE

(71) Applicant: Exact Corporation, Modesto, CA (US)

(72) Inventors: Douglas W. Flora, Modesto, CA (US); Nelson Tye, Modesto, CA (US)

(73) Assignee: Exact Corp., Modesto, CA (US)

( * ) Notice: Subject to any disclaimer, the term of this patent is extended or adjusted under 35 U.S.C. 154(b) by 320 days.

(21) Appl. No.: 15/951,778

(22) Filed: Apr. 12, 2018

(51) Int. Cl.
*B60D 1/06* (2006.01)
*B62D 13/00* (2006.01)
*F16C 11/06* (2006.01)
*B62B 3/00* (2006.01)
*F16C 11/08* (2006.01)
*B62D 7/16* (2006.01)

(52) U.S. Cl.
CPC .......... *F16C 11/0604* (2013.01); *B62B 3/001* (2013.01); *B62D 7/16* (2013.01); *F16C 11/08* (2013.01); *B62B 2301/05* (2013.01); *F16C 11/0695* (2013.01); *F16C 2326/24* (2013.01)

(58) Field of Classification Search
CPC .............. F16C 11/0604; F16C 11/0661; F16C 11/0609; F16C 2360/24; F16C 2326/24; B62B 3/001; B60D 1/06; B60D 2001/005; B62D 13/00; B62D 13/02; B62D 13/025; A01B 59/042
USPC ........ 280/511, 492, 493, 494; 172/282, 283, 172/284
See application file for complete search history.

(56) References Cited

U.S. PATENT DOCUMENTS

| | | | | |
|---|---|---|---|---|
| 1,574,461 | A * | 2/1926 | Witsberger | B60D 1/07 280/511 |
| 3,107,505 | A * | 10/1963 | Koss | F16C 11/0623 464/141 |
| 5,452,766 | A * | 9/1995 | Imamura | A01B 63/112 172/7 |
| 6,619,686 | B1 * | 9/2003 | Klar | B60D 1/54 280/491.3 |
| 7,871,097 | B2 * | 1/2011 | Sparkes | B60D 1/00 280/480 |
| 8,342,560 | B2 * | 1/2013 | Albers | B60D 1/065 280/511 |
| 9,796,228 | B2 * | 10/2017 | Hu | B60W 30/18036 |
| 2004/0100357 | A1 * | 5/2004 | Kruse | B60G 17/019 338/128 |
| 2005/0082788 | A1 * | 4/2005 | Lippons | B60D 1/02 280/511 |
| 2007/0040355 | A1 * | 2/2007 | Spratte | B60G 17/015 280/511 |
| 2012/0321374 | A1 * | 12/2012 | Ray | B25B 23/0035 403/111 |

(Continued)

*Primary Examiner* — Anne Marie M Boehler
(74) *Attorney, Agent, or Firm* — R. Scott Kimsey, Esq.; Klein DeNatale Goldner

(57) ABSTRACT

A steerable axle includes a housing defining a ball seat therein, a ball member received within the ball seat and defining a cutout portion to receive a portion of a ball bearing therein, an interstitial space defined by a surface of the ball seat and a surface of the ball member, and a ball bearing disposed within the interstitial space and received into the cutout portion of the ball member. The ball bearing moves within the interstitial space when the ball member rotates along the x or y axis, but is restricted from movement along the z axis. Restriction of movement of the ball bearing along the z axis results in a corresponding restriction of movement of the ball member along the z axis.

10 Claims, 11 Drawing Sheets

(56) References Cited

U.S. PATENT DOCUMENTS

2013/0001924 A1\* 1/2013 Adamczyk ............... B60D 1/30
280/511

\* cited by examiner

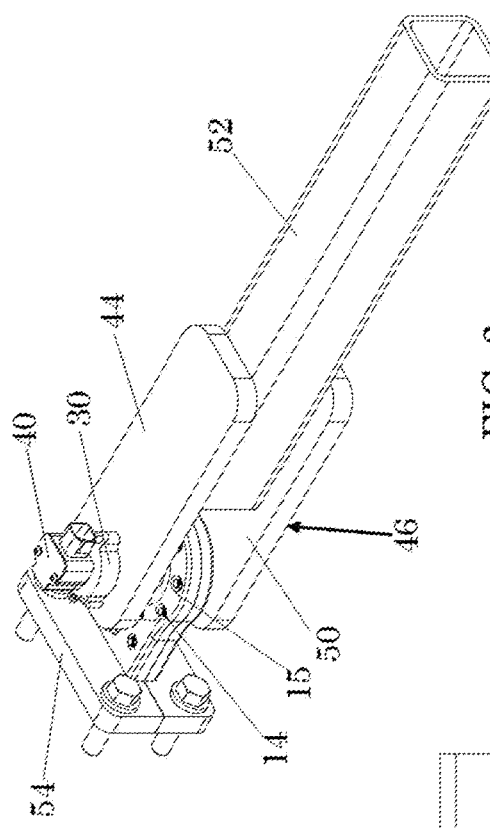
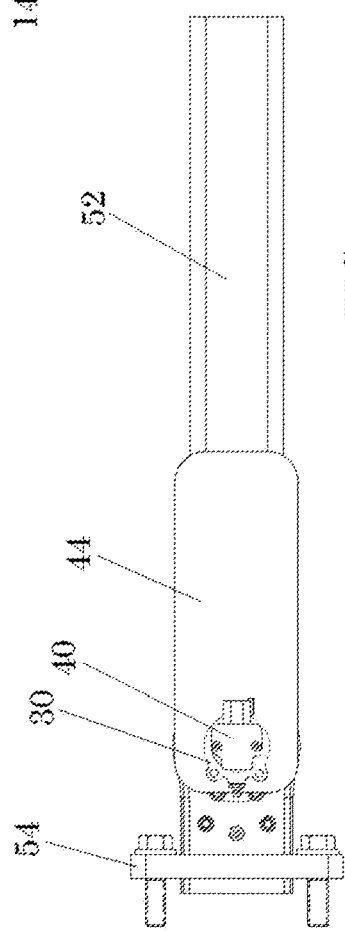
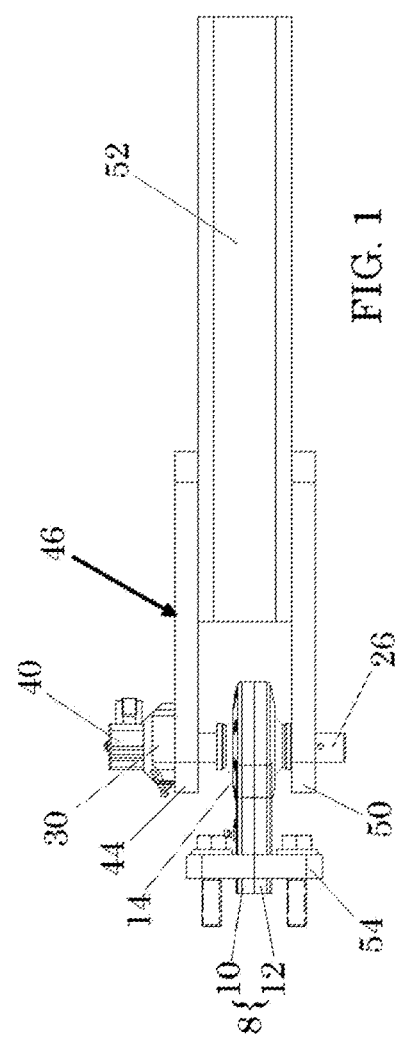
FIG. 1
FIG. 2
FIG. 3

STEERABLE AXLE

RELATED APPLICATIONS

Not Applicable.

BACKGROUND AND FIELD

1. Field

The present disclosure relates generally to a ball and socket joint, and more specifically to a steerable axle having a ball and socket joint restricted in movement about the z axis.

2. Background

Carts, wagons, and other pulled vehicles (referred to, for convenience, collectively as "carts") are ubiquitous across society, and commonplace in the agricultural industries. Carts may be used, for example, to hold fruits, nuts, and other products during harvest time. Such carts are commonly pulled behind a motorized vehicle, such as a tractor, and may be pulled along orchards and the like, from plant to plant and row to row, to be filled with harvested produce.

In relatively confined or tight spaces, such as when turning from one row of trees in an orchard into an immediately-adjacent row, it may be difficult to ensure a proper turn of the cart. The cart may, for example, cut the corner between rows too sharply. This may lead to the cart striking a tree or other object, and can damage the cart and/or the tree or other object. A mechanism for allowing a cart to follow a path similar to that of the motorized vehicle would allow greater control over the path of the cart, particularly during turns, and allow the operator of the motorized vehicle to turn more easily without damaging the cart or other property.

SUMMARY

One aspect of the present disclosure provides a steerable axle having a housing defining a ball seat therein, a ball member received within the ball seat and defining a cutout portion to receive a portion of a ball bearing therein, an interstitial space defined by a surface of the ball seat and a surface of the ball member, and a ball bearing disposed within the interstitial space and received into the cutout portion of the ball member. The ball bearing moves within the interstitial space when the ball member rotates along the x or y axis, but is restricted from movement along the z axis. Restriction of movement of the ball bearing along the z axis results in a corresponding restriction of movement of the ball member along the z axis.

In another aspect of the present disclosure, the steerable axle includes a clevis hitch having a first prong and a second prong. The first prong has a first opening therethrough and the second prong has a second opening therethrough. A ball shaft extends through the first opening in the first prong, through an opening extending through the ball member, and through the second opening in the second prong.

In another aspect of the present disclosure, the ball shaft defines a sensor shaft opening in a first end thereof. The sensor shaft opening is configured to receive a portion of a rotary sensor.

In another aspect of the present disclosure, the steerable axle includes a rotary sensor having a rotary sensor shaft. The rotary sensor shaft extends into the sensor shaft defined in the ball shaft.

In another aspect of the present disclosure, the ball shaft has a generally D-shaped cross-section.

In another aspect of the present disclosure, the steerable axle includes a housing opening. The first end of the ball shaft extends through the housing opening. A housing rod extends from the shaft housing into a rod opening defined in the first prong of the clevis hitch, thus ensuring that the shaft housing does not rotate when the ball shaft rotates.

In another aspect of the present disclosure the steerable axle includes a clevis hitch having a first prong defining a first opening and a second prong having a second opening. The steerable axle further includes a pin having a shaft housing and a ball shaft. The ball shaft includes a first end and a second end. The first end of the ball shaft defines a sensor shaft opening. The ball shaft extends through the first opening of the first prong of the clevis hitch, through an opening defined by the ball member, and through the second opening defined by the second prong. The shaft housing is attached to the first prong of the clevis hitch so that the shaft housing does not rotate when the ball shaft rotates.

In another aspect of the present disclosure, the steerable axle includes a rotary sensor attached to the pin. The rotary sensor has a sensor shaft that extends into the sensor shaft opening.

Another aspect of the present disclosure provides a steerable axle having a housing defining a ball seat and a ball member disposed within said ball seat. The ball member is adapted to rotate freely along an x or y axis, but is restricted from movement along a z axis.

BRIEF DESCRIPTION OF THE FIGURES

FIG. 1 is a side elevation view of one embodiment of a ball and socket joint and pin of the present disclosure.

FIG. 2 is a top elevation view of the ball and socket joint and pin of FIG. 1.

FIG. 3 is a rear and side perspective view of the ball and socket joint and pin of FIG. 1.

DETAILED DESCRIPTION

Figure 4:
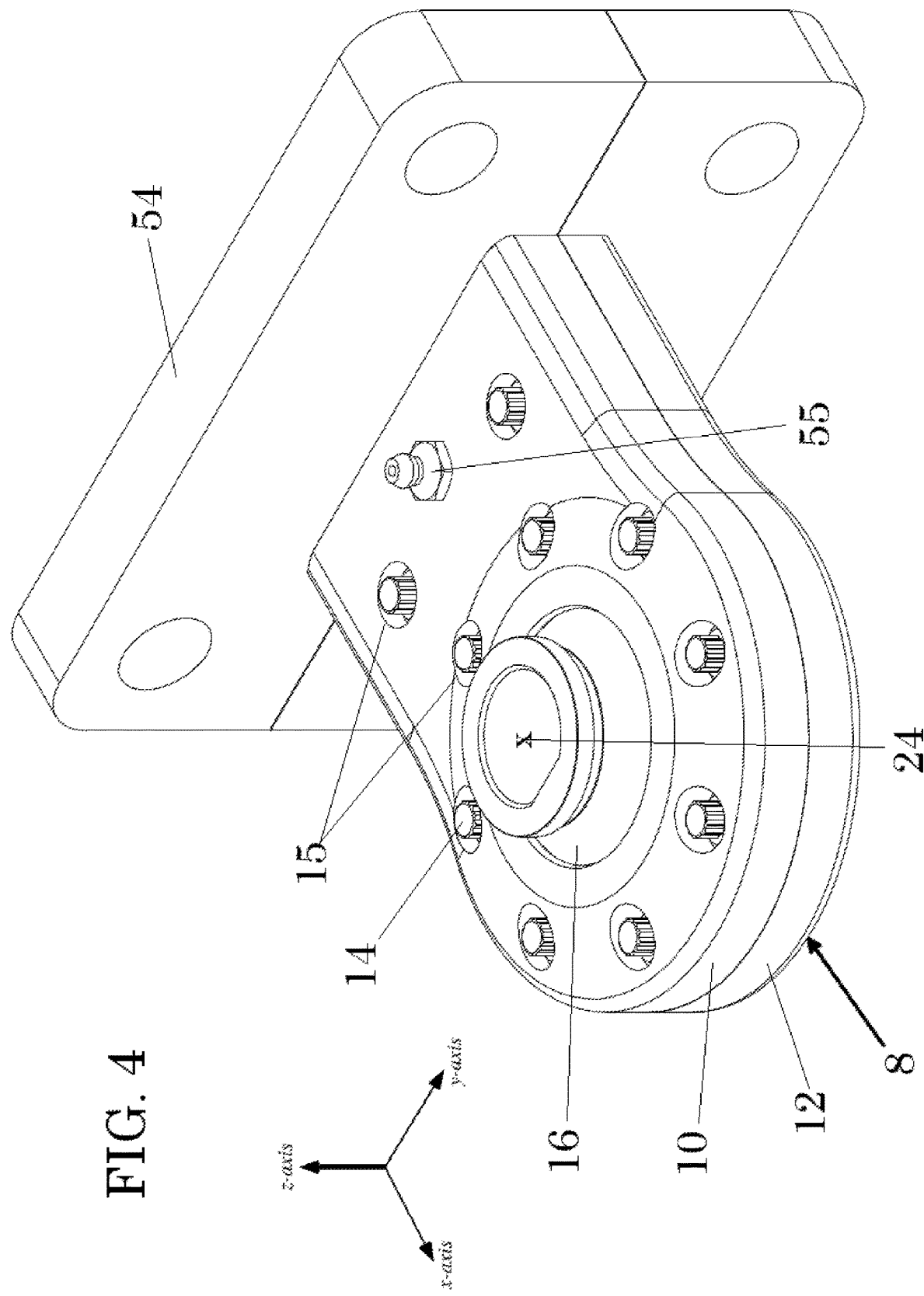
FIG. 4 is a side perspective view of components of the ball and socket joint of FIG. 1.

With reference to the drawings, wherein like numerals indicate like parts, FIG. 1 depicts one embodiment of a ball and socket joint according to the present disclosure. Shown is a housing 8, which in the embodiment shown is constructed from an upper housing member 10 and a lower housing member 12 (though it is contemplated that the housing may be formed from a single member or from more than two members). The upper and lower housing members are attached by a plurality of fasteners 14 extending through openings 15 formed into the housing members for that purpose. Ball member 16 is shown received into a ball seat 17 formed by the upper housing members 10 and lower housing member 12. As described below, the characteristics of the ball member 16 and ball seat 17 are such that ball member 16 is able to rotate freely about the x and y axes, but is restricted from rotating around the z axis.

Also shown in FIG. 1 is a ball shaft 26, which extends through an opening 42 in first prong 44 of clevis hitch 46, through ball shaft opening 24, and through opening 48 in second prong 50 of clevis hitch 46. Shaft housing 30 is disposed atop ball shaft 26, and a rotary sensor 40 is disposed atop shaft housing 30. A lifting eye 74 is disposed atop clevis hitch 46. An arm 52 is attached to clevis hitch 46 and extends away therefrom.

FIG. 2 is a top view of the embodiment of a steerable axle shown in FIG. 1, and FIG. 3 is a rear and side perspective view of the same.

FIG. 4 is a close perspective view of housing 8 and associated components, as well as attachment plate 54. The drawing provides a clear view of a plurality of fasteners 14 extending through a plurality of openings 15 in upper housing member 10. Lower housing member 12 includes corresponding openings (not visible) through which fasteners 15 extend sufficiently to allow use of nuts or other means to secure the fasteners to the housing.

Ball member 16 is depicted disposed within housing 8. Ball shaft opening 24 extends through ball member 16 and is configured to accept ball shaft 26. In the embodiment shown, the ball shaft opening 24 is generally 'D' shaped. It is contemplated that in such embodiments, ball shaft 26 has a corresponding shape. Housing 8 is attached to attachment plate 54, which has a variety of openings through which fasteners 56 may attach the attachment plate to the chassis of a tractor or other vehicle. Also shown in FIG. 4 is grease zerk 55, which allows grease to be pumped into the joint shown. Grease zerk 55 is in fluid communication with a channel 57 (shown in FIG. 8), which in turn is in fluid communication with the joint.

Figure 5:
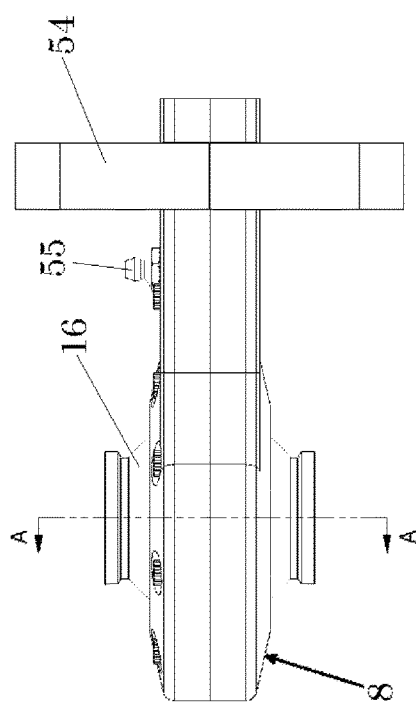
FIG. 5 is a side elevation view of the components of a ball and socket joint shown in FIG. 4.

FIG. 5 provides a side view of the embodiment of housing 8, ball member 16, and attachment plate 54 of FIG. 4. The same structures are shown in front view in FIG. 6.

Figure 7:
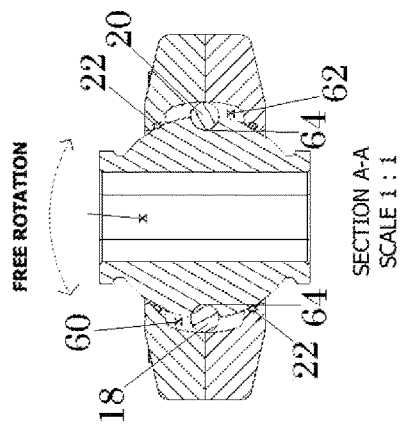
FIG. 7 is a cross-section view taken along line A-A of FIG. 5.

FIG. 7 is a cross-section view of certain components of the embodiment of the present device shown in FIG. 5. The cross-section is taken along line A-A of FIG. 5. Shown are the housing 8 and ball member 16. As can been seen in the drawing, ball member 16 includes a pair of cutout portions 64, each on opposite ends of ball member 16 from the other. The cutout portions 64 are configured to receive ball bearings 18 and 20, respectively. Between the interior surface of housing 8 and the exterior surface of ball member 16, interstitial spaces 60 and 62 are defined. Ball bearings 18 and 20 are disposed within these interstitial spaces and also within the cutout portions 64 of ball member 16. Ball bearings 18 and 20 may move freely within interstitial spaces 60 and 62, respectively, as ball member 16 rotates about the x axis. The interior walls of housing 8, however, prevent movement along the z axis. O-rings 22 are preferably provided at the points of contact between housing 8 and ball member 16, as shown.

Figure 8:
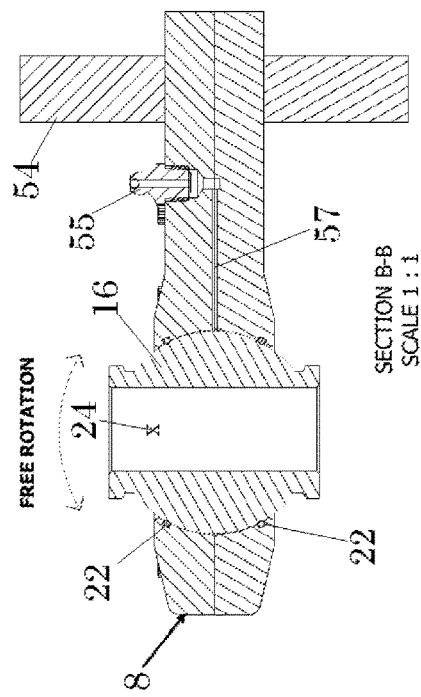
FIG. 8 is a cross-section view taken along line B-B of FIG. 6.
Figure 6:
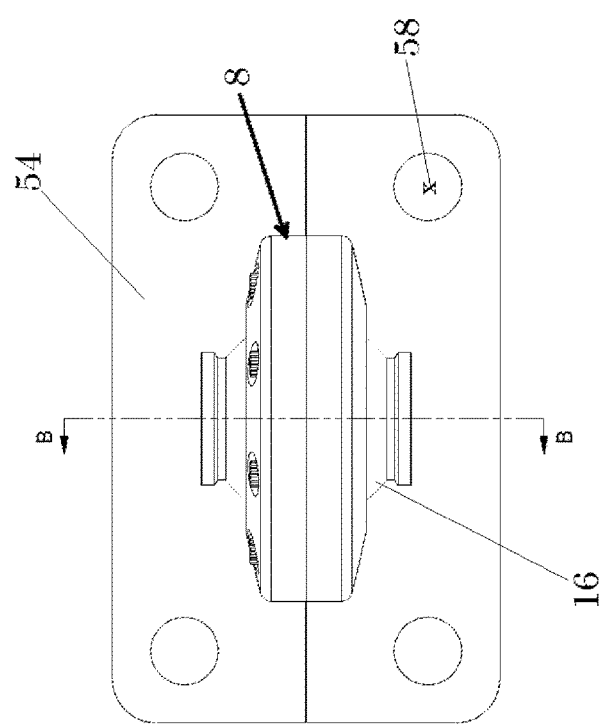
FIG. 6 is a front elevation view of the components of a ball and socket joint shown in FIG. 4.

FIG. 8 is also a cross-section view of certain components of the embodiment of the present device shown in FIGS. 5 and 6, but with the cross-section taken along line B-B. Housing 8 is shown, as well as o-rings 22 positioned near the upper and lower edges of housing 8, at points where ball member 16 comes closest to making contact with the interior surface of ball seat 17 defined by the interior surface of housing 8. Ball member 16 is able to rotate freely about the y axis, as indicated in the drawing.

Figure 9:
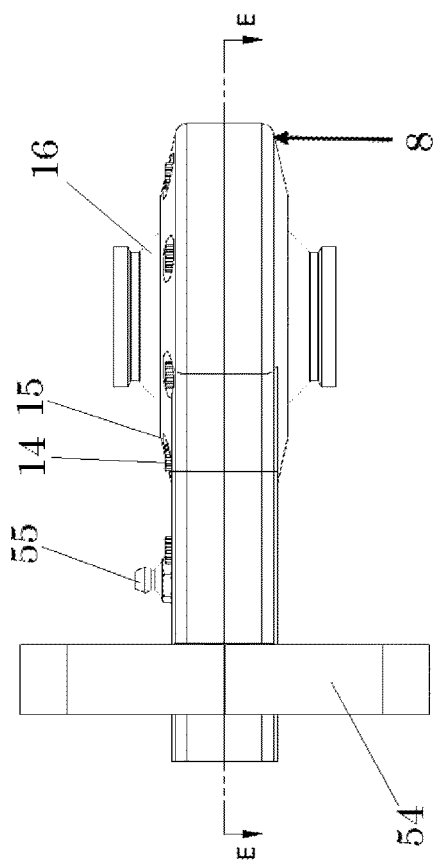
FIG. 9 is a side elevation view of the components of a ball and socket joint, shown from the opposite side as FIG. 5.
Figure 10:
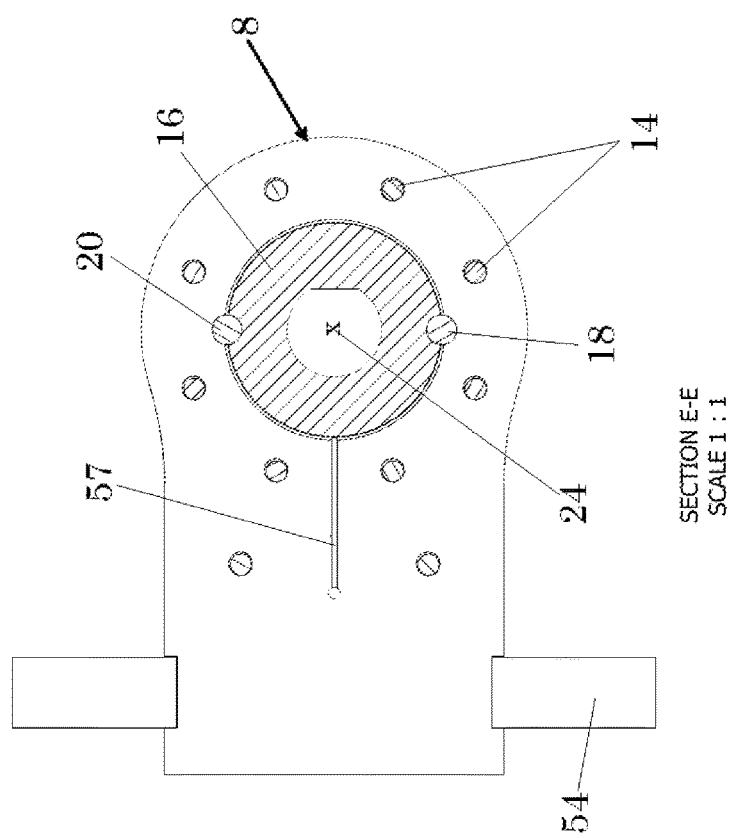
FIG. 10 is a cross-section view taken along line E-E of FIG. 9

FIG. 9 is a side view of an embodiment of housing 8, ball member 16, attachment plate 54, and related components shown from the side opposite that shown in FIG. 5. FIG. 10 is a cross-section view of the components of FIG. 9, taken through line E-E thereof. Shown in FIG. 10 are attachment plate 54, housing 8, fasteners 14, ball bearings 18 and 20, ball member 16, ball shaft opening 24, and channel 57.

Figure 11:
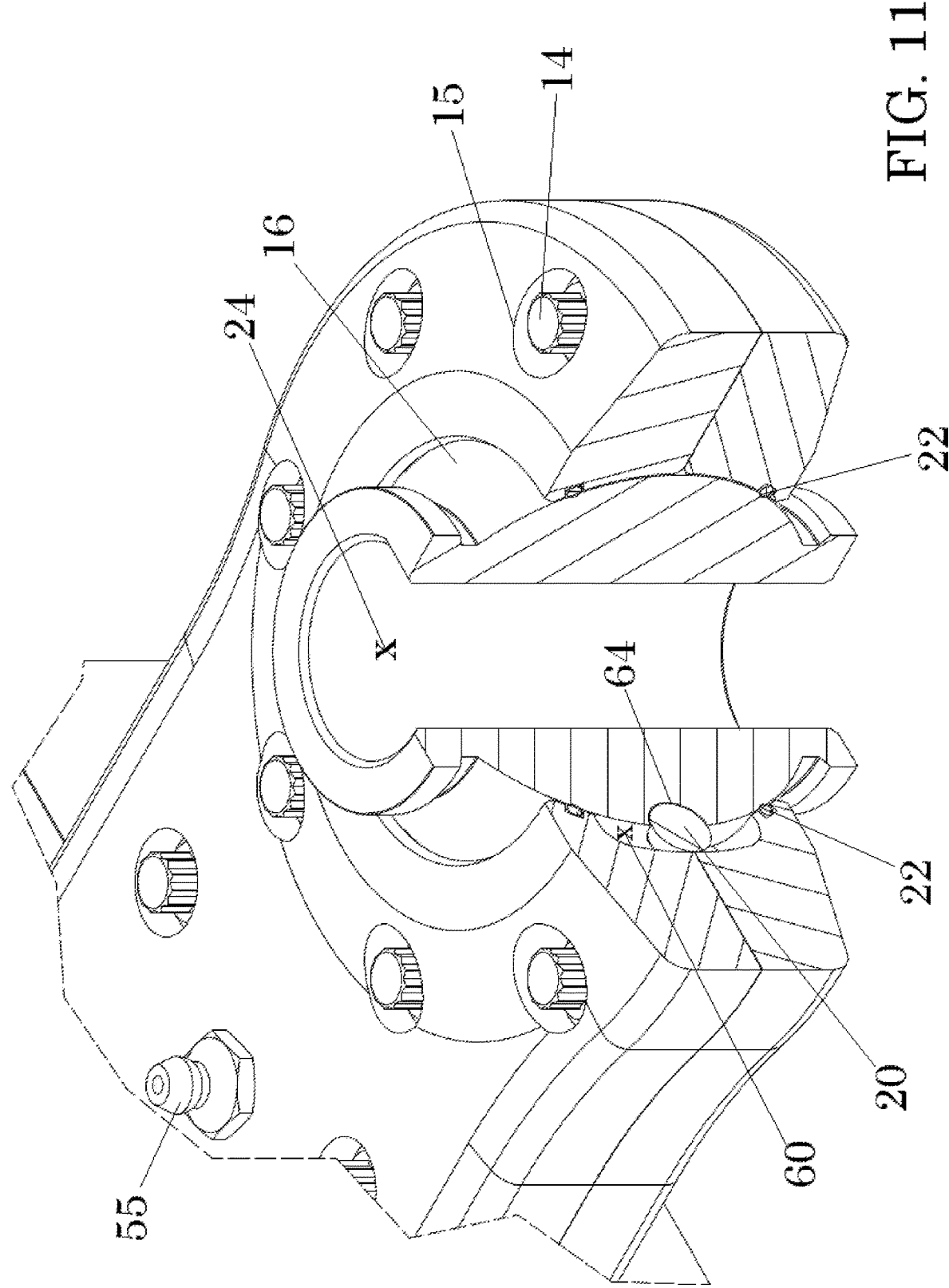
FIG. 11 is a detailed perspective view of components of a ball and socket joint shown in FIG. 4.

FIG. 11 is a front and side perspective view of one embodiment of housing 8, ball member 16, and associated components. Housing 8 includes upper housing member 10 and lower housing member 12, attached by fasteners 14. Ball member 16 is disposed within ball seat 17 of housing 8, and the figure also shows o-rings 22 near the upper and lower edges of ball seat 17. Also depicted is cutout portion 64 of ball member 16, with second ball bearing 22 engaged therewith and disposed within interstitial space 62.

Figure 12:
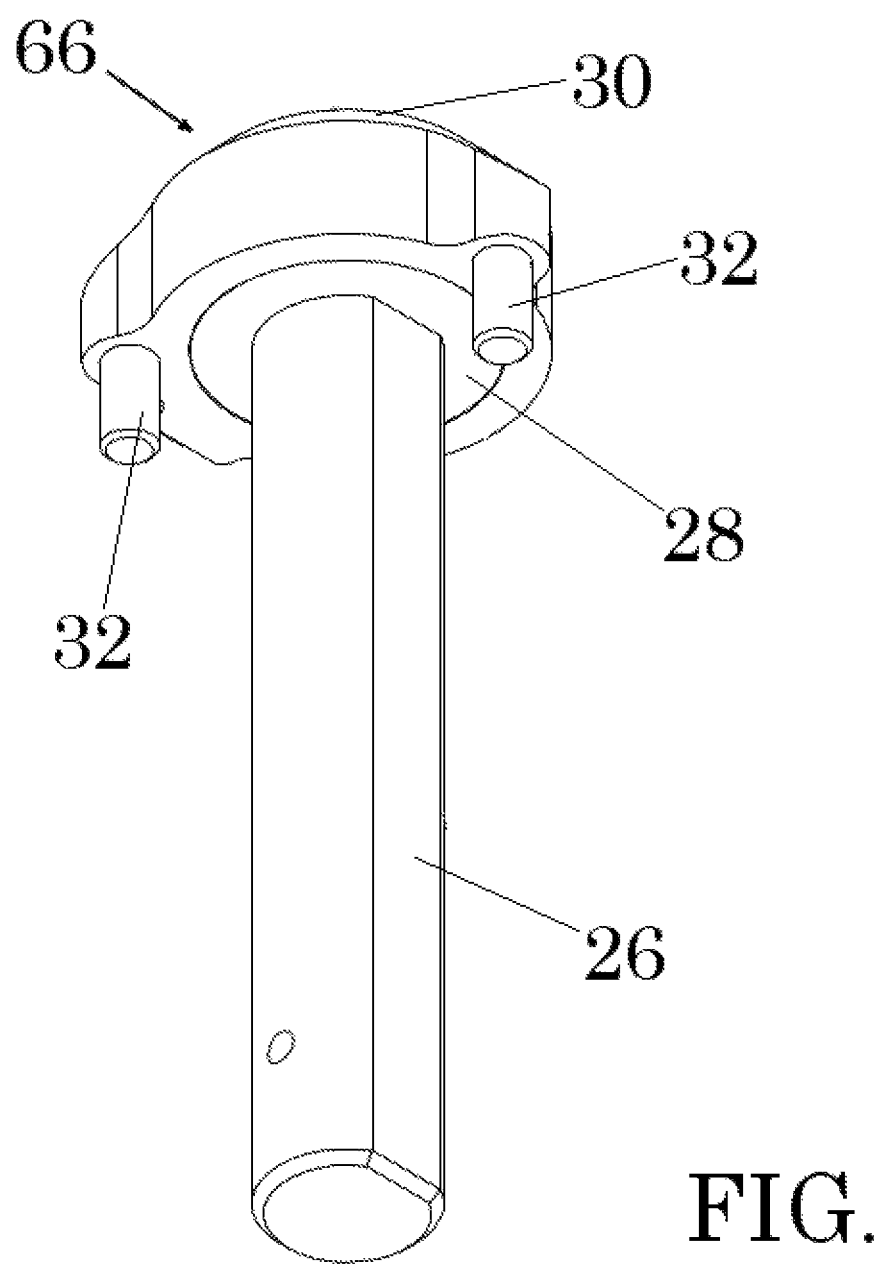
FIG. 12 is a bottom and side perspective view of one embodiment of a pin of the present disclosure.

FIG. 12 provides a side and bottom perspective view of a pin 64 for use with one embodiment of the present disclosure. Pin 66 includes a shaft housing 30 at the upper end thereof and a ball shaft 26 extending away from the shaft housing. Ball shaft 26 has, in this embodiment a generally 'D' shaped profile sized and shaped to be received into ball shaft opening 24 of ball member 16. Housing 30 includes a shaft retainer 28 that allows the upper end of ball shaft 26 to be seated securely within shaft housing 30. Housing rods 32 extend downward from shaft housing 30 and are sized and shaped to be received by corresponding openings in the upper surface of first prong 44 of clevis hitch 46. Thus, housing rods 32 ensure pin 66 is mounted securely to clevis hitch 46.

Figure 14:
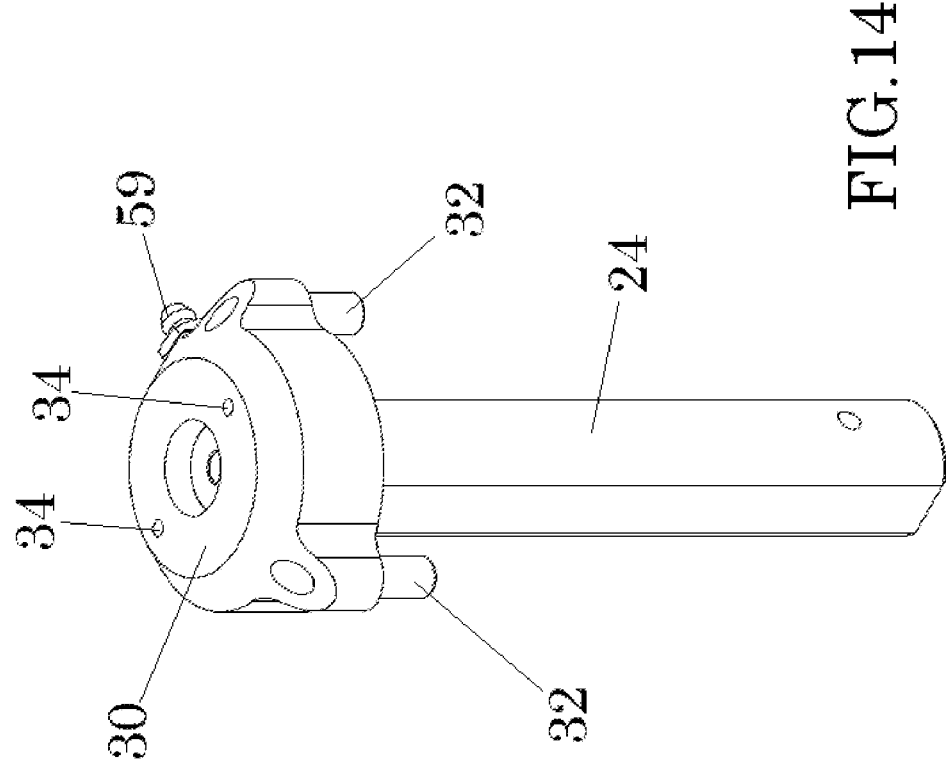
FIG. 14 is a top and side perspective view of the pin of FIG. 12.
Figure 13:
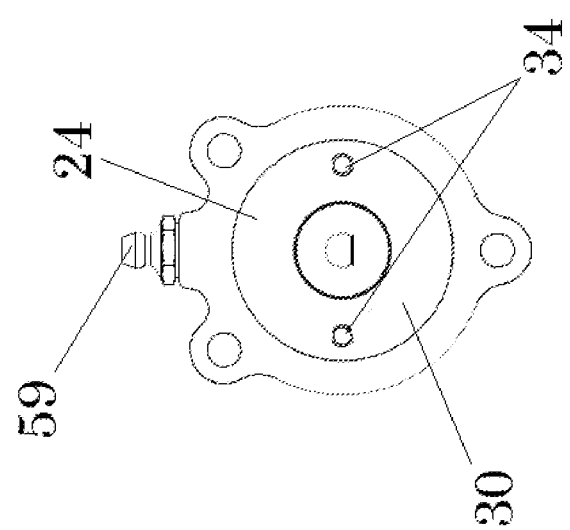
FIG. 13 is a top elevation view of the pin of FIG. 12.

FIG. 13 provides a top view of pin 66. The top surface of ball shaft 26 can be seen, as can a generally 'D' sensor shaft opening 67, described in more detail below. From this view, it can be seen that the upper surface of shaft housing 30 includes two rotary sensor mount openings 34, to which a rotary sensor may be attached, also as described in greater detail below. FIG. 14 provides a top and side perspective view of pin 66, with labeled parts corresponding to those described above. Shaft housing 30 further preferably includes a grease zirk 59 in fluid communication with the interior thereof.

Figure 15:
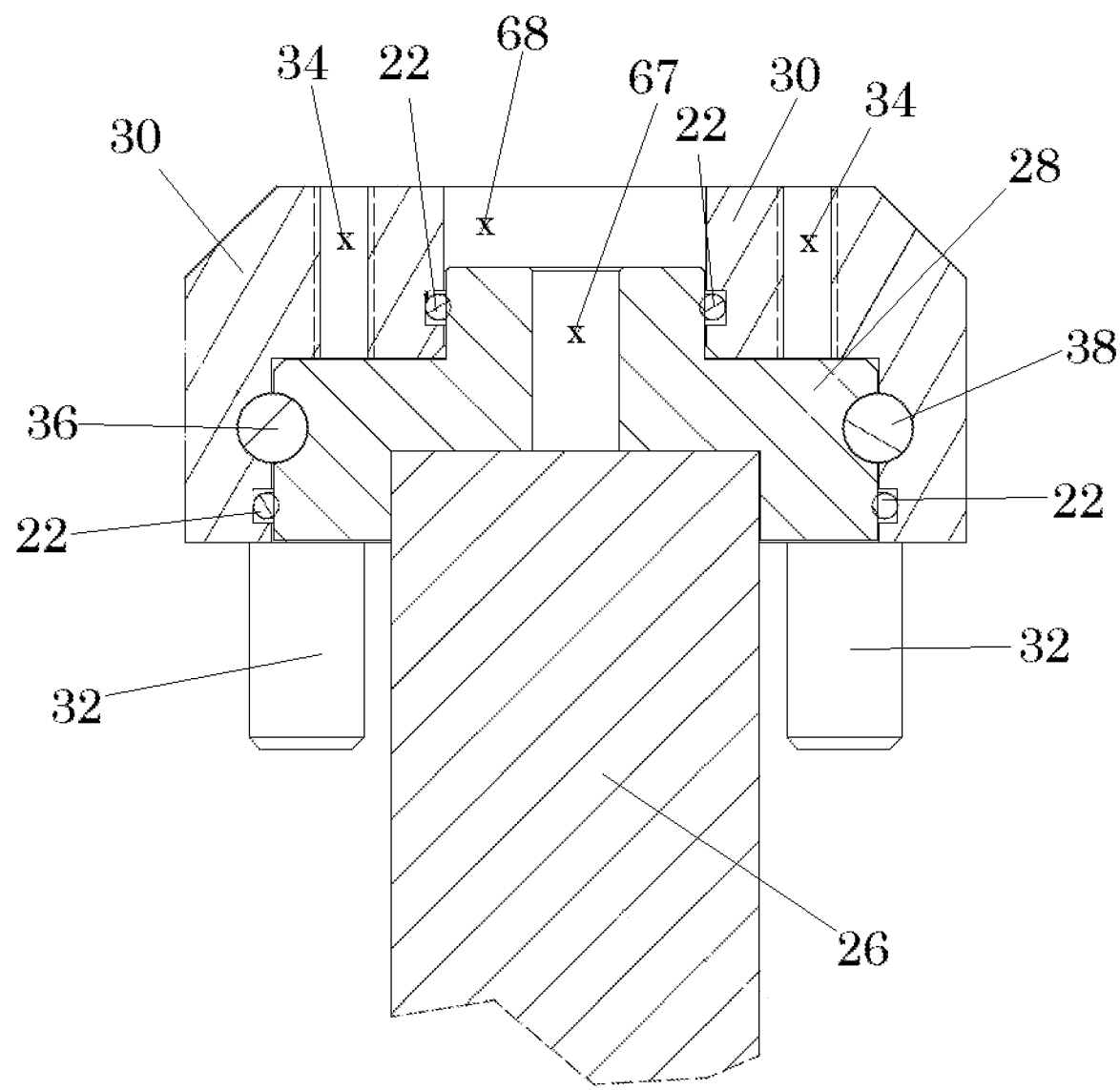
FIG. 15 is a cross-section view of one embodiment of a pin of the present disclosure.

FIG. 15 is a cross-section view of an upper surface of pin 66, providing a detailed view of various components thereof. Shaft retainer 28 is disposed atop ball shaft 26 and engages ball bearings 36 and 38, which each in turn engage shaft housing 30. O-rings 22 are disposed between shaft retainer 28 and shaft housing 30. As seen clearly in FIG. 13, shaft retainer 28 is preferably recessed within shaft housing 30 to make room for the underside of a rotary sensor 40, described below. An opening 68 is defined through shaft retainer 28 to the upper edge of ball shaft 26 to accommodate the rotating shaft of rotary sensor 40, also described in greater detail below.

Figure 16:
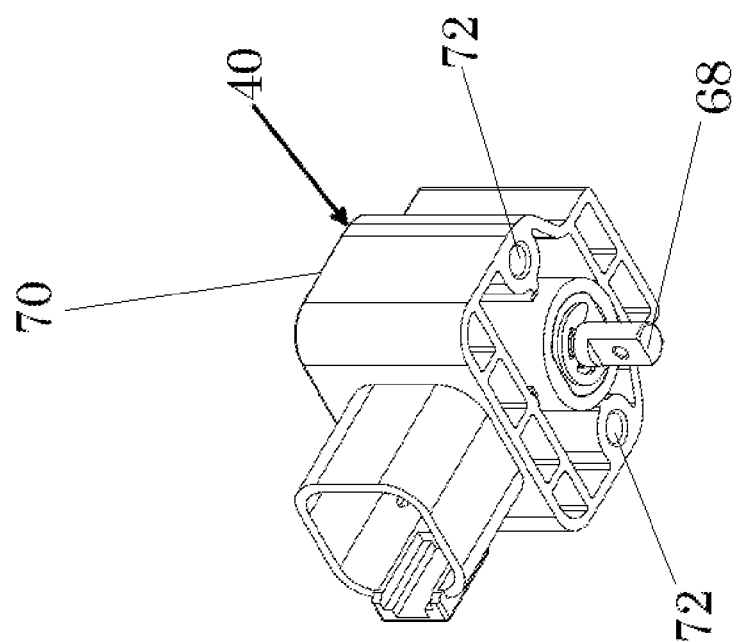
FIG. 16 is a bottom and side perspective view of one embodiment of a rotary sensor suitable for use with the device of the present disclosure.

FIG. 16 depicts one embodiment of a rotary sensor 40 suitable for use with the device of the present disclosure. Rotary sensor 40 includes rotary sensor shaft 68, and the sensor is operable to determine the position of the shaft. Use of rotary sensor 40 allows for monitoring of angular motion of the present device, including angular displacement, angular velocity, angular acceleration, and the like. The sensing components of rotary sensor 40 are disposed within rotary sensor housing 70. Fastener openings 72 are configured to receive fasteners to affix rotary sensor 40 atop pin 66 but insertion of the fasteners through openings 72 and into rotary sensor mount openings 34.

Figure 17:
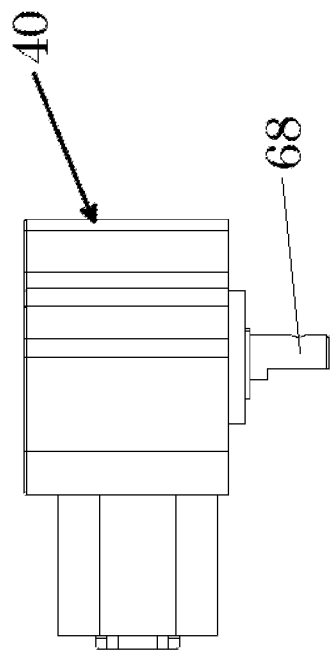
FIG. 17 is a side elevation view of the rotary sensor of FIG. 16.
Figure 18:
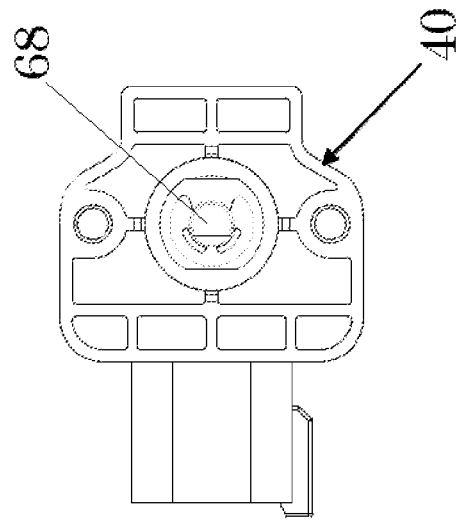
FIG. 18 is a bottom elevation view of the rotary sensor of FIG. 16.
Figure 19:
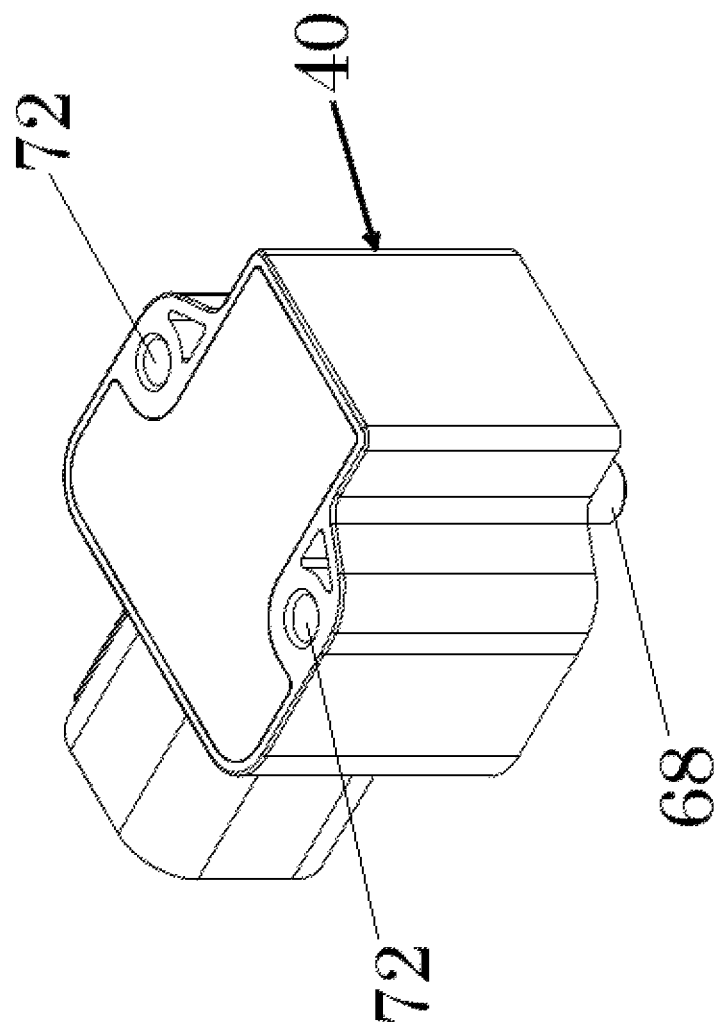
FIG. 19 is a top and side perspective view of the rotary sensor of FIG. 14

FIG. 17 is a side elevation view of the embodiment of a rotary sensor 40 of FIG. 16. FIG. 18 depicts a bottom elevation view of the same, while FIG. 19 is a top and side perspective view of the exemplary sensor.

Figure 20:
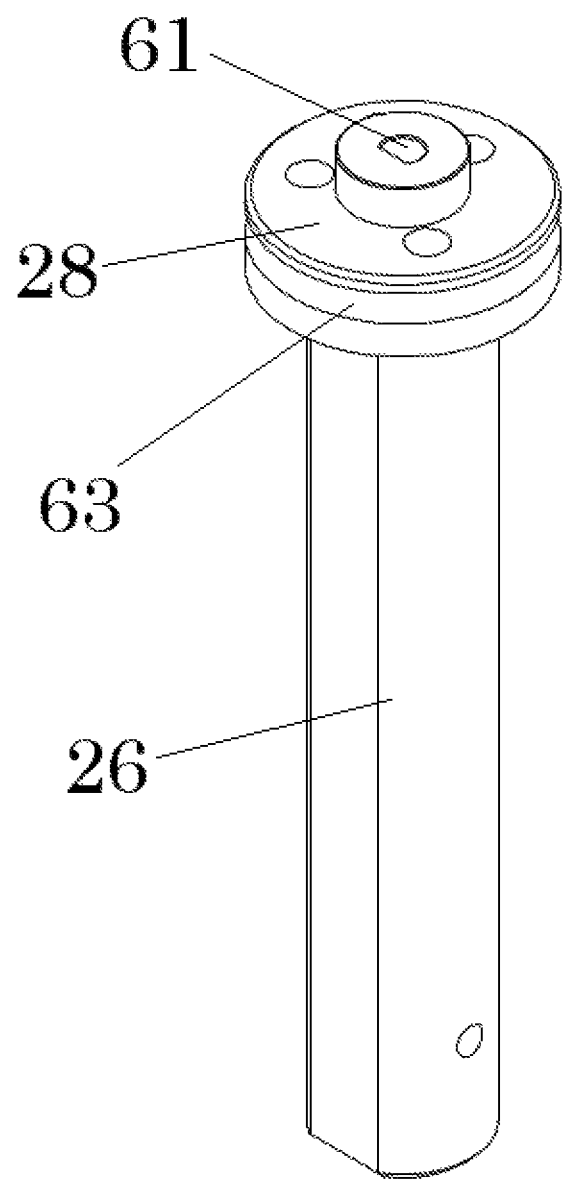
FIG. 20 is a perspective view of internal components of a pin of the present disclosure.

FIG. 20 is a perspective view of internal components of pin 66. Shaft retainer 28 is shown, and protruding upwardly therefrom a generally annular extension defining a sensor shaft opening 61. Ball shaft 26 extends downward from shaft retainer 28. A track 63 is provided around the perimeter of shaft retainer 28. The shaft is configured to receive ball bearings to lock the pin and housing together.

When pin 66 is assembled and attached to the present device, housing rods 32 extend into the openings in clevis hitch 46 to prevent rotation of shaft housing 30. Ball shaft 26 is inserted into ball shaft opening 24. The ball shaft and shaft retainer rotate with the cart or other vehicle being pulled. The rotary sensor inserted into the opening in ball shaft 26 detects the degree of rotation of ball shaft 26.

Having thus described the preferred embodiment of the invention, what is claimed as new and desired to be protected by Letters Patent includes the following:

1. An articulated coupling comprising:
a housing member defining a ball seat therein;
a ball member received within said ball seat, the ball member defining a cutout portion configured to receive a portion of a ball bearing therein;
an interstitial space defined by a surface of said ball seat and a surface of said ball member;
a ball bearing disposed within said interstitial space and received into the cutout portion of the ball member;
a clevis hitch comprising a first prong and a second prong, wherein said first prong defines a first opening therein and said second prong defines a second opening therein; and
a ball shaft extending through said first opening of said first prong, through a ball shaft opening defined by said ball member and extending therethrough, and through said second opening of said second prong,
wherein said ball bearing moves within said interstitial space when said ball member rotates along an x or y axis, but is restricted from movement along a z axis, and further wherein the restriction of movement of the ball bearing along a z axis results in a corresponding restriction of movement of the ball member along the z axis.

2. The articulated coupling according to claim 1, wherein said ball shaft defines a sensor shaft opening in a first end thereof, the sensor shaft opening configured to receive a portion of a rotary sensor therein.

3. The articulated coupling according to claim 2, further comprising:
a rotary sensor comprising a rotary sensor shaft, wherein said rotary sensor shaft is received into the sensor shaft opening defined in said ball shaft.

4. The articulated coupling according to claim 1, wherein said ball shaft has a generally D-shaped cross-section.

5. The articulated coupling according to claim 3, further comprising:
a shaft housing defining a housing opening, the first end of said ball shaft extending through the housing opening; and
a housing rod extending from said shaft housing into a rod opening defined in the first prong of said clevis hitch, such that said shaft housing does not rotate when said ball shaft rotates.

6. An articulated coupling comprising:
a housing member defining a ball seat therein;
a ball member received within said ball seat, the ball member defining a cutout portion configured to receive a portion of a ball bearing therein;
an interstitial space defined by a surface of said ball seat and a surface of said ball member;
a ball bearing disposed within said interstitial space and received into the cutout portion of the ball member;
a clevis hitch comprising a first prong defining a first prong opening therein and a second prong defining a second prong opening therein; and
a pin comprising a shaft housing and a ball shaft, wherein the ball shaft comprises a first end and a second end, and further wherein the first end of the ball shaft defines a sensor shaft opening,
wherein said ball bearing moves within said interstitial space when said ball member rotates along an x or y axis, but is restricted from movement along a z axis, and further wherein the restriction of movement of the ball bearing along a z axis results in a corresponding restriction of movement of the ball member along the z axis,
further wherein the ball shaft extends through the first opening of said first prong, through an opening defined by said ball member, and through the second opening defined by said second prong,
and further wherein said shaft housing is attached to said first prong of said clevis hitch such that said shaft housing does not rotate when said ball shaft rotates.

7. The articulated coupling according to claim 6, further comprising a rotary sensor attached to said pin and comprising a sensor shaft extending into said sensor shaft opening.

8. An articulated coupling comprising:
a housing defining a ball seat;
a ball member disposed within said ball seat;
a clevis hitch comprising a first prong and a second prong, wherein said first prong defines a first opening therein and said second prong defines a second opening therein; and
a ball shaft extending through said first opening of said first prong, through a ball shaft opening defined by said ball member and extending therethrough, and through said second opening of said second prong,
wherein said ball member is adapted to rotate freely along an x or y axis, but is restricted from movement along a z axis.

9. The articulated coupling according to claim 8, wherein said ball shaft defines a sensor shaft opening in a first end thereof, the sensor shaft opening configured to receive a portion of a rotary sensor therein.

10. The articulated coupling according to claim 9, further comprising a rotary sensor comprising a rotary sensor shaft, wherein said rotary sensor shaft is received into the sensor shaft opening defined in said ball shaft.

\* \* \* \* \*